March 19, 1968     A. LESSARD     3,373,792
AUTOMOBILE RAIN VISOR
Filed Sept. 13, 1965     2 Sheets-Sheet 1
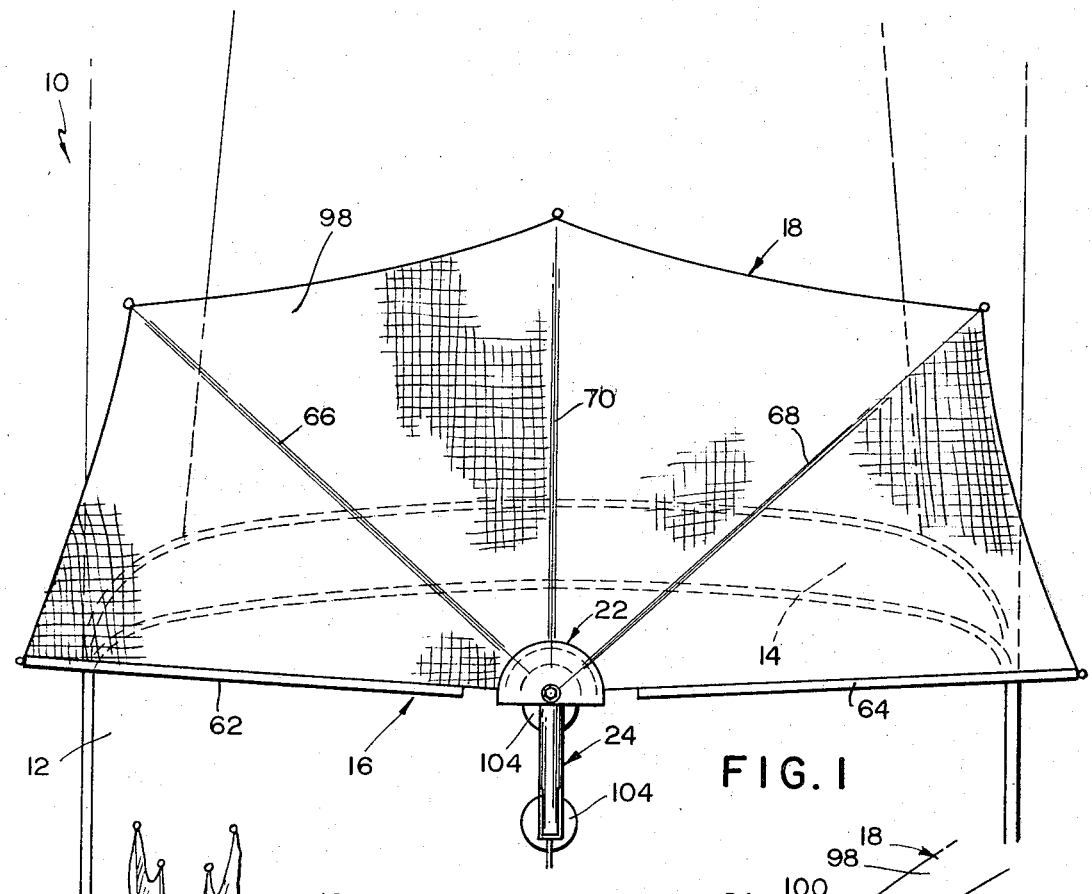
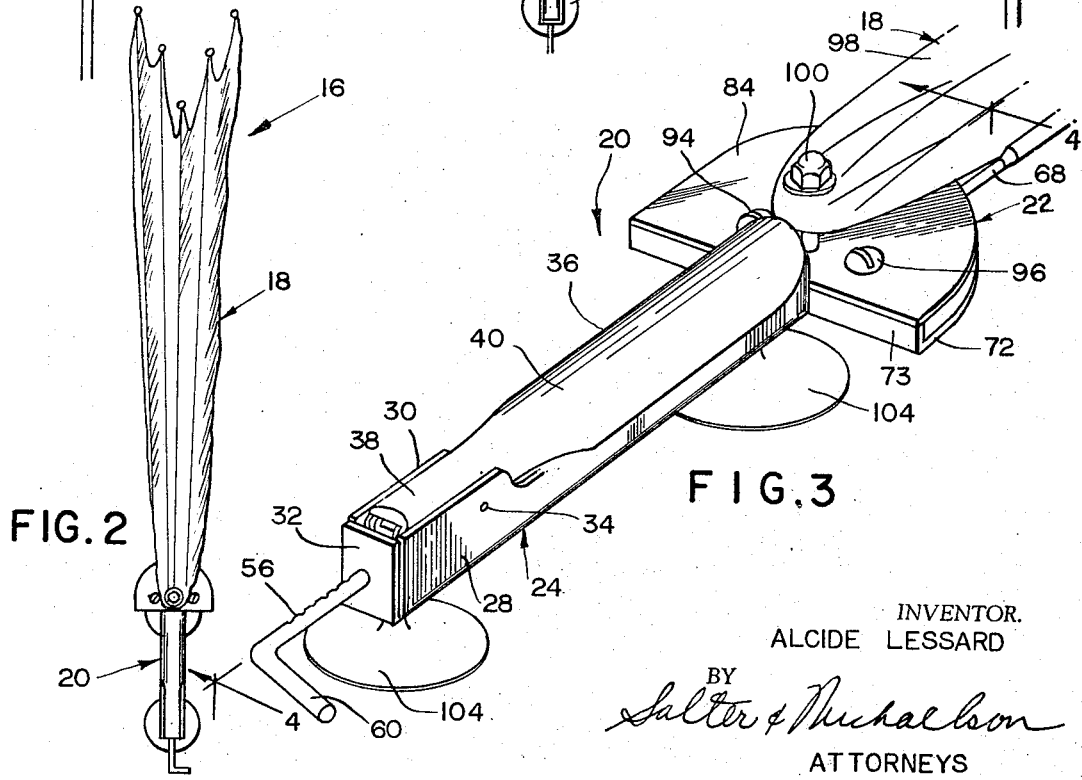
*INVENTOR.*
ALCIDE LESSARD
BY
*Salter & Michaelson*
ATTORNEYS March 19, 1968     A. LESSARD     3,373,792
AUTOMOBILE RAIN VISOR
Filed Sept. 13, 1965     2 Sheets-Sheet 2
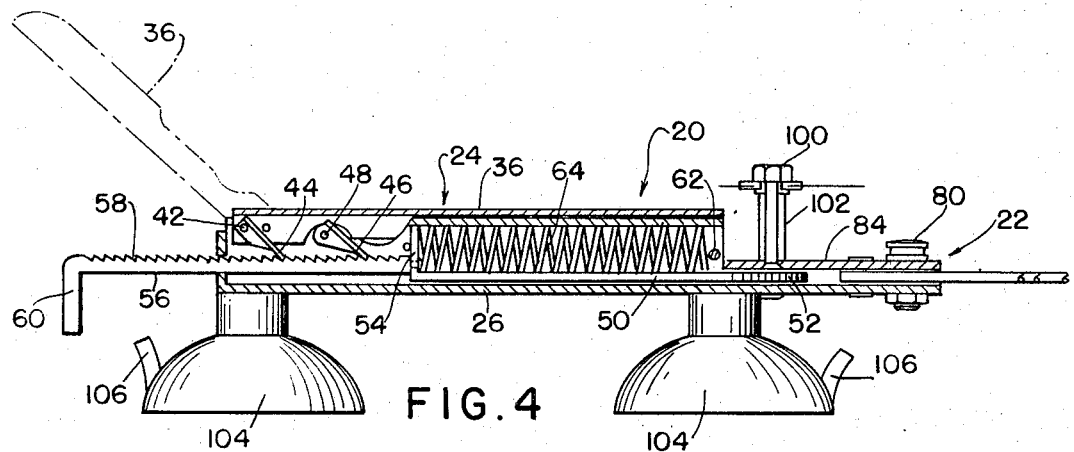
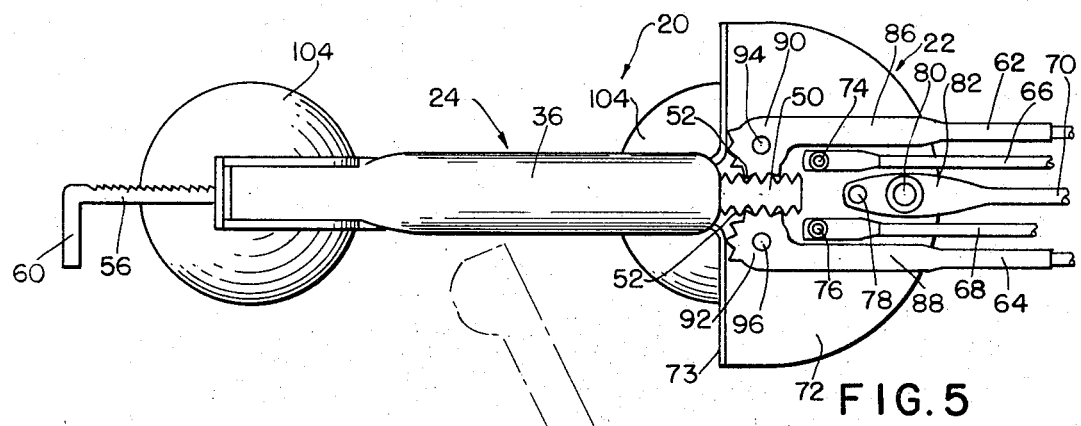
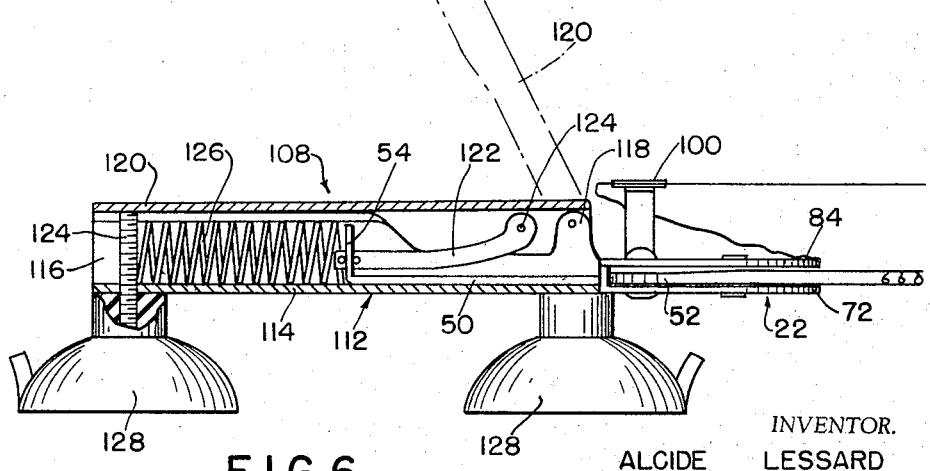
INVENTOR.
ALCIDE LESSARD
BY
*Salter & Michaelson*
ATTORNEYS United States Patent Office 3,373,792
Patented Mar. 19, 1968

3,373,792
AUTOMOBILE RAIN VISOR
Alcide Lessard, 545 Scituate Ave.,
Cranston, R.I. 02910
Filed Sept. 13, 1965, Ser. No. 486,761
5 Claims. (Cl. 160—368)

ABSTRACT OF THE DISCLOSURE

An automobile rain visor for attachment to the roof of an automobile having a flexible waterproof sheet that is moved to and from an extended position by an operating mechanism, the operating mechanism including a handle that is pivotally moved and that cooperates with a spring to effect the movement of the sheet to and from the extended position.

The present invention relates to an automobile rain visor. More particularly, the present invention relates to a rain visor for use in the protection of the windshield of an automobile against rain, and has particular application and use in drive-in theatres. In Patent No. 3,156,497, a rain visor for use in protection of an automobile windshield against rain is disclosed for use particularly in drive-in theatres. The present invention is an improvement in the windshield rain visor illustrated and described in the above-mentioned patent.

The present invention defines a unique structural arrangement of parts which provide for location of the rain visor on the roof of an automobile that is disposed overhanging relation with respect to the windshield thereof. Essentially, the rain visor of the present invention includes a support assembly having a forward and rearward portion. Means, preferably in the form of suction cups are secured to the support assembly for mounting the rain visor on the top surface or roof of the automobile. A plurality of spaced radially extending arms are pivotally mounted on the forward portion of the support assembly and are movable from a folded position to a spread position. A flexible sheet of water-proof material is secured to the arms and is expandible by said arms when the arms are pivoted from the folded position to the spread position thereof. The outermost of said arms are formed with gear portions thereon that are mounted for rotating movement in the forward portion of the support assembly. Disposed in the rear portion of the support assembly and projecting forwardly into engagement with the gear portions of the outermost arms is a longitudinally extending rack, while a spring is operably interconnected to the rack and in the preferred form of the invention normally urges the rack in a forwardly direction for moving the gear portions and the outermost arms joined thereto to the open or spread position thereof. In another form of the invention, in order to retract the arms to the folded position thereof, an actuating device is provided and includes a pivotally mounted actuating member to which a ratchet device is connected. The actuating member in this form of the invention operates the ratchet to move the rack forwardly for moving the arms to the open position thereof. In the preferred form of the invention the actuating device is operatively connected to the rack through a lever, and upon pivotal movement of the actuating device, the rack is retracted in response to movement of the lever for locating the arms in the folded position thereof.

Accordingly, it is an object of the present invention to provide a rain visor for an automobile that can be quickly and effectively applied to the top of the automobile for protecting the windshield thereof from rain.

Another object of the invention is to provide an automobile rain visor which includes a plurality of radiating arms to which a flexible waterproof material is secured, the arms being retained in the extended position thereof by a spring urged actuating device, and being withdrawn to the folded position thereof upon movement of the actuating device against the action of the spring.

Still another object is to provide an actuating device for use in an automobile rain visor that includes a ratchet construction for effectively moving the visor arms to the open position thereof.

Still another object is to provide an actuating device for an automobile rain visor which includes a pivotally mounted actuating member that is interconnected to the visor arms through a lever, pivotal movement of the actuating member producing a corresponding folding action of the visor arms.

Other objects, features and advantages of the invention will become apparent as the description thereof proceeds when considered in connection with the accompanying illustrative drawings.

In the drawings which illustrate the best mode presently contemplated for carrying out the invention:

FIG. 1 is a top plan view of the front portion of an automobile showing the rain visor embodied in the present invention mounted on the roof and overlying the windshield thereof.

FIG. 2 is a top plan view of the rain visor as it is located in the closed or folded position thereof.

FIG. 3 is an enlarged fragmentary view of the rain visor illustrated in FIGS. 1 and 2, showing one form of an operating mechanism associated therewith.

FIG. 4 is a sectional view taken along lines 4—4 in FIG. 3.

FIG. 5 is a top plan view of the operating mechanism illustrated in FIG. 4 with the top plate of the forward portion of the operating mechanism removed; and FIG. 6 is a sectional view similar to FIG. 4 showing a modified form of the rain visor operating mechanism.

Referring now to the drawings and particularly to FIG. 1, an automobile generally indicated at 10 is illustrated and includes a roof 12 and a windshield 14 that are formed in the conventional manner. Since the invention is normally employed for the shielding of the windshield 14, the rain visor generally indicated at 16 and to be described hereinafter is normally mounted on the roof 12 of the automobile adjacent to the windshield 14. It is understood, however, that the rain visor may be secured to the roof 12 of the automobile in overhanging relation with respect to a side thereof, and thereby define a sun shield or rain shield for this area of the automobile.

As shown in FIGS. 1 and 2, the rain visor 16 includes a shield member generally indicated at 18 and a support assembly generally indicated at 20 that is operatively connected to the shield member 18. Referring to FIGS. 3, 4 and 5, one form of the support assembly 20 is shown and includes a forward support generally indicated at 22 and a rear operating assembly generally indicated at 24. The operating assembly 24 of the support assembly 20 includes a housing that is elongated in configuration and that is defined by a bottom wall 26 to which sides 28 and 30 are joined, the side walls being relatively short at the forward end thereof but being of full height at the rear end thereof. A rear wall 32 is also joined to the bottom wall 26 and is bent at right angles with respect thereto and is of the same height as the adjacent rear portions of the side walls. Mounted for pivotal movement on the housing of the operating assembly 24 and secured in pivotal relation to the side walls 28 and 30 by a pivot pin 34 is an actuating handle 36. As seen in FIG. 3, the actuating handle 36 has a reduced neck 38 that is received between relatively enlarged rear portions of the side walls 28 and 30 and includes an arcuate portion 40 that overlies the relatively short front portions of the side walls 28 and 30. Joined to the actuating handle 36 by a pin 42 at the rear of the operating assembly housing is a ratchet finger 44, while a ratchet lock 46 is pivotally mounted between the side walls 28 and 30 by a pin 48. As will be described, the shield member 18 is normally located in the closed position thereof as seen in FIG. 2 and is movable to the open position thereof by a rack member 50 in which a plurality of teeth 52 are formed in the forward side edges thereof. The major portion of the rack 50 extends into the interior of the housing of the operating assembly 24, and terminates in a rear flange 54. An elongated latch rod 56 is secured to the rear flange 54 on an edge thereof. The latch rod 56 extends through the rear wall 32 and terminates at the rear end thereof in a handle portion 60. Disposed between the rear flange 54 and a lock pin 62 that extends through the side walls 28 and 30, is a tension spring 64 that normally urges the rack 50 in a rearwardly longitudinal direction and thus normally locates the shield member 18 in the closed position thereof. As seen in FIG. 4, in order to move the rack 50 forwardly, the actuating handle 36 is pivoted to the dotted line position in a series of strokes thereby causing the ratchet finger 44 to engage the serrations 58 of the rod 56 for moving the rod 56 and rack 50 in a forwardly direction. The ratchet lock 46 which also engages the serrations 58 will act to hold the rod 56 and rack 50 in the forward position thereof. As the rod 56 and the rack 50 joined thereto are urged forwardly in a longitudinal direction, the tension spring 64 is compressed, which provides for movement of the rack 50 rearwardly when the rod 56 is released. As will be further described, in order to release the rod 56, the handle portion 60 is rotated, thereby turning the rod 56 so as to remove the serrations 58 from engagement with the ratchet lock 46. The rod 56 and the rack 50 are thus moved longitudinally in a rearwardly direction in response to release of the tension spring 64.

The primary object of the invention is to provide a rain shield for the windshield 14. For this purpose, the shield member 18 is provided and, as shown in FIGS. 1 and 5, includes a plurality of radially extending arms defined by outer arms 62 and 64, inner arms 66 and 68, and a central arm 70. The shield member arms are mounted at their inner ends on a fan-shaped plate 72 that is formed as part of the forward support 22, the plate 72 as seen in FIG. 5, including an inner flange 73 that is joined to the bottom wall 26 of the operating assembly 24. The inner arms 66 and 68 are pivotally mounted on the plate 72 by pivot pins 74 and 76, respectively, while the central arm 70 is fixed in position on the plate 72 by a pin 78. As will be described, a thumb screw 80 extends through an enlarged portion of the central arm 70 for mounting a top plate 84 on the bottom plate 72, the screw 80 further cooperating with the pin 78 to locate the central arm 70 in fixed position.

Joined to the inner ends of the outer arms 62 and 64 are enlarged portions 86 and 88, respectively, the enlarged portions 86 and 88 terminating in gear portions 90 and 92, respectively. As seen in FIG. 5, the gear portions 90 and 92 are located in intermeshing relation with the teeth 52 of the rack 50 and are mounted for rotation on the plate 72 by pivot screws 94 and 96, respectively, that also extend through the bottom and top plates 72 and 84. It is seen that upon longitudinal movement of the rack 50, the gear portions 90 and 92 that are joined to the outer arms 62 and 64 will be rotated to pivotally move the outer arms in a corresponding manner.

As shown in FIG. 1, the arms 62–70 are located in radiating relation with respect to the plate 72 of the forward support 22 and are spaced thereon so as to define a fan-shaped configuration when located in the fully extended position thereof. Joined to the arms in any conventional manner is a flexible sheet 98 of waterproof material that is formed in sections. The sheet 98 thus defines a protective covering that in the fully extended position thereof overlies the windshield 14 in the manner illustrated in FIG. 1. In this connection, it will be noted that the inner arms 66 and 68 are slightly longer than the outer arms 62 and 64 and central arm 70 and cooperate therewith to define a special configuration that substantially overlies the entire windshield area for protecting the windshield 14 from rain. In order to anchor the flexible sheet to the forward support 22, a post 100 is provided and extends through the sheet 98 and is secured to the top plate 84. A spacer 102 is located between the head of the anchor bolt 100 and the top plate 84 and provides sufficient space therebetween for movement of the sheet 98 when the shield member 18 is moved to the fully extended position thereof. As previously described, the thumb screw 80 is adapted to secure the top plate 84 to the bottom plate 72 and cooperates with the pivot screws 94 and 96 that secure the outer arms 62 and 64 in place for further joining the top and bottom plates together.

In order to mount the rain visor 10 on the top 12 of the automobile, any suitable means may be employed, although as illustrated herein, suction cups 104 are utilized and are secured to the bottom wall 26 of the operating assembly 24 by any suitable bolts or the like. Tabs 106 are joined to the suction cups 104 for lifting an edge thereof so as to provide for quick release of the visor when the unit is to be removed from the roof 12 of the automobile.

In operation and use, the rain visor 16 is mounted on the roof 12 of the automobile by means of the suction cups 104 and is located in overlying relation with respect to the windshield 14. The shield member 18 in the unmounted position is retained in the folded position thereof and is locked in this position by means of the operating assembly 24. The open position is obtained when the unit is mounted in place on an automobile roof. Thus, the actuating handle 36 is pivotally moved in short strokes to move the rack 52 longitudinally in a forward direction to compress the spring 64, thereby rotating the gear portions 90 and 92 for moving the outer arms 62 and 64 to the open position thereof. Since the inner arms 66 and 68 are interconnected to the outer arms 62 and 64 through the sheet 98, the entire shield assembly will be moved to the open position as the outer arms 62 and 64 are pivoted to the outer position thereof. When it is desired to close the visor while in place on the roof 12, the rod handle 60 is rotated to unlock the rod 56 from the ratchet lock 46. The rack 50 is thus released and under action of the tension spring 64 moves rearwardly in a longitudinal direction to pivot the outer arms 62 and 64 to the closed position thereof. This carries the inner arms 66 and 68 therewith, thereby moving the sheet 98 to the fully closed position as seen in FIG. 2.

Referring now to FIG. 6, a modified form of the operating assembly is illustrated and is generally indicated at 108. As will be described, the operating assembly 108 is adapted to be employed with the shield member 18 in the manner as described above. As seen in FIG. 6, the operating assembly 108 is joined to the forward support 20 in a manner substantially identical to that illustrated in FIGS. 1 through 5 and includes a bottom wall 114 that is substantially elongated in configuration and to which side walls 116 are joined. Pivotally connected to ears 118 of the side walls 116 is an actuating handle 120 that overlies the side walls 116 and the bottom wall 114. A lever 122 is pinned to the actuating member 120 at 124 and is further connected to the flange 54 of the rack 50 which in the form of the invention illustrated in FIG. 6 is substantially the same as that illustrated in FIGS. 1 through 5. Interposed between the flange 54 and a bolt 124 that extends through the bottom wall 114 is a tension spring 126. It is seen that the tension spring 126 urges the rack 50 in a forwardly longitudinal direction for normally locating the shield member 18 in the spread position thereof. In order to mount the visor 16 including the operating mechanism 108 on the top 12 of the automobile 10, suction cups 128 are provided and are joined to the bottom plate 114 in any suitable manner. As shown in FIG. 6, the rear suction cup 128 is joined to the bottom plate 114 by means of the bolt 124.

In operation, the shield member 18 is moved to the folded position thereof by moving the actuating handle 120 to a down position, thereby retracting the rack 50 and compressing the spring 126. The gear portions 90 and 92 of the outer arms 62 and 64 are thus rotated in the manner as described above to move the inner arms 64, 66 and sheet member 98 to the folded position thereof. In order to locate the shield member 18 in the spread position after mounting the visor on the roof 12 of the automobile, the actuating handle 120 is lifted to the dotted-line position as illustrated in FIG. 6, thereby releasing the tension spring 126. The tension spring 126 then moves the rack 50 in a forwardly longitudinal direction to rotate the gear portions 90, 92 of the outer arms, which in turn carry the outer arms 62, 64, inner arms 66, 68, and flexible sheet to the spread position.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In a rain visor for an automobile, a support assembly, a shield member interconnected to said support assembly and including a plurality of radially extending pivotally movable arms to which a flexible sheet of waterproof material is attached, said arms being located generally in and movable in a horizontal plane so that when said flexible sheet is extended it is generally horizontal, an operating mechanism mounted on said support assembly for controlling movement of said arms, said operating mechanism including a longitudinally movable rack that is operatively interconnected to at least two of said arms for controlling the pivotal movement thereof, a spring operatively engaging said rack for causing longitudinal movement in one direction thereof, and a handle operatively interconnected to said rack and being pivotally movable in a plane that is generally normal to the plane in which said arms are located, said handle being pivotally movable to longitudinally move said rack for pivotally moving said arms in a first direction and said rack being further movable in response to said spring for pivotally moving said arms in a second direction.

2. In a rain visor as set forth in claim 1, the two arms interconnected to said rack having gear segments joined thereto that engage said rack and are responsive to longitudinal movement thereof for pivotally moving said arms to and from the open and closed positions thereof.

3. In a rain visor as set forth in claim 1, said operating mechanism further including a rod having a serrated portion formed thereon, said rod being operatively interconnected to said handle and to said rack, a ratchet member connected to said handle and engaging said serrated rod for causing longitudinal forward movement of said rod when said handle is pivotally actuated, a pawl member engaging said serrated portion for retaining the rod in the forward position to which it is moved, and said spring being located between said handle and arms and being compressed upon actuating movement of said handle to provide for return movement of said rack and rod when said pawl is released from the serrated portion of said rod.

4. In a rain visor as set forth in claim 3, said rod being rotatable on its axis so as to move the serrated portion thereof out of engagement with said pawl, thereby releasing said rod to provide for return movement thereof and said rack in response to the action of said spring.

5. In a rain visor as set forth in claim 1, said operating mechanism further including a lever that is interconnected to said handle and to said rack, said spring being located between said lever and the rear end of said support assembly, said lever being movable rearwardly upon location of said handle in the closed position thereof to compress said spring thereby moving said rack rearwardly for closing said arms and sheet attached thereto, said spring being responsive to the movement of said handle to the open position for urging said rack forwardly to open said arms and sheet attached thereto.

References Cited
UNITED STATES PATENTS

| 735,776 | 8/1903 | Kaltenecker | 135—24 |
|---|---|---|---|
| 2,454,059 | 11/1948 | Heaney | 135—24 |
| 2,897,002 | 7/1959 | Yovich | 296—95 |
| 3,156,497 | 11/1964 | Lessard | 296—95 |

BENJAMIN HERSH, *Primary Examiner.*

J. A. PEKAR, *Assistant Examiner.*